United States Patent
Fujimoto et al.

(10) Patent No.: US 8,038,574 B2
(45) Date of Patent: Oct. 18, 2011

(54) APPARATUS AND METHOD FOR CONTROLLING AUTOMATIC TRANSMISSION

(75) Inventors: Kinya Fujimoto, Hitachinaka (JP); Yoshiyuki Yoshida, Hitachi (JP); Tetsuo Matsumura, Hitachinaka (JP); Masashi Seimiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 567 days.

(21) Appl. No.: 12/186,962

(22) Filed: Aug. 6, 2008

(65) Prior Publication Data
US 2009/0042692 A1    Feb. 12, 2009

(30) Foreign Application Priority Data
Aug. 7, 2007    (JP) .................... 2007-204867

(51) Int. Cl.
*F16H 61/00*    (2006.01)
(52) U.S. Cl. ........................ 477/130; 477/127
(58) Field of Classification Search .................. 477/115, 477/121, 127, 130, 156
See application file for complete search history.

(56) References Cited

U.S. PATENT DOCUMENTS

| | | | | |
|---|---|---|---|---|
| 5,368,531 A | * | 11/1994 | Ando et al. | 477/155 |
| 5,908,370 A | * | 6/1999 | Kubo et al. | 477/144 |
| 2004/0192494 A1 | * | 9/2004 | Ozeki et al. | 477/3 |

FOREIGN PATENT DOCUMENTS

| | | |
|---|---|---|
| JP | 10-318361 A | 12/1998 |
| JP | 2000-234654 A | 8/2000 |
| JP | 2001-295898 A | 10/2001 |
| JP | 2003-269592 A | 9/2003 |
| JP | 2007-170439 A | 7/2007 |
| JP | 2007-232047 A | 9/2007 |

* cited by examiner

*Primary Examiner* — Ha D. Ho
(74) *Attorney, Agent, or Firm* — Crowell & Moring LLP

(57) ABSTRACT

A shift control apparatus for an automatic transmission includes a pre-shift device that operates a predetermined synchromesh, based on a prediction by a predicting device. It thereby couples together a transmission input shaft (with a friction transfer mechanism that has not been used to effect a current gear position) and a transmission output shaft, through a predetermined gear train, and brings them into a standby state. The time when it is determined that the friction transfer mechanism that has not been used to effect of the current gear position has been disengaged is taken as the timing with which the synchromesh coupling operation by the standby control is started, regardless of the completion of the achievement of the current gear position.

6 Claims, 7 Drawing Sheets

APPARATUS AND METHOD FOR CONTROLLING AUTOMATIC TRANSMISSION

CLAIM OF PRIORITY

The present application claims priority from Japanese patent application serial no. 2007-204867 filed on Aug. 7, 2007, the contents of which are hereby incorporated by reference into this application.

FIELD OF THE INVENTION

The present invention relates to an apparatus and control method for controlling an automatic transmission particularly a gear type automatic transmission used in an automobile.

BACKGROUND OF THE INVENTION

In recent years, an automated manual transmission (hereafter, abbreviated as "automated MT") has been developed in an automobile technical field. This is a system used for automating operation of a clutch configured with a friction mechanism and operation of a synchromesh as a gear change mechanism in a gear type transmission which originally used to be used as a manual transmission. In the automated MT, when shifting is started, a clutch for transferring/interrupting torque of an engine as a driving force source is disengaged and a synchromesh is switched, and then the clutch is engaged again.

In JP-A-2000-234654 and JP-A-2001-295898, twin-clutch automated MTs are disclosed; the twin-clutch automated MT has two clutches for transferring input torque to a transmission and drive torque is alternately transferred by the two clutches. In the twin-clutch automated MT, when shifting is started, a first clutch that has been transferring torque before the shifting, is gradually disengaged, and a second clutch for the next gear position is gradually engaged; and drive torque is changed from the one equivalent to the current gear ratio to the one equivalent to the next gear ratio. As a result, interruption of the drive torque is avoided and smooth shifting can be achieved.

With respect to the above-mentioned twin-clutch automated MT, a so-called pre-shift control is disclosed in JP-A-10-318361 and JP-A-2003-269592. The pre-shift control is carried out to shorten a time required for shifting to the next gear position. That is, the pre-shift control is done such that, when a gear position is in some position, a next gear position is predicted; a transmission input shaft whose clutch has not been used for a current gear position is selectively coupled to a transmission output shaft by a synchromesh and they are thereby allowed to stand by in the next gear position.

The pre-shift control where the gear position is pre-shifted to the next position makes it possible to enhance a response for gear shifting when the prediction comes true. However, provided that a driver's request shift operation is done by the driver during the pre-shift control for the next shifting, an operation of the synchromesh according to the driver's request shift must be started after the pre-shift control is achieved. And then, when the operation of the synchromesh is completed, the clutch to clutch shift in engagement is started. As a result, the response is degraded.

The invention is to provide a control apparatus for twin-clutch automatic transmissions possible to advance start timing of pre-shift control and enhance the response when a shifting request continuously occurs.

SUMMARY OF THE INVENTION

The invention to achieve the above object is configured as follows. A shift control apparatus for automatic transmissions is comprised of: plural friction transfer mechanisms (for example, clutches) for transferring power of a driving force source and interrupting this transfer; plural transmission input shafts respectively coupled with the friction transfer mechanisms; and plural gear trains for selectively coupling together the transmission input shafts and a transmission output shaft by the selecting operation of plural synchromeshes.

Furthermore, the shift control apparatus is configured such that: a desired gear position is achieved by coupling together the transmission input shaft with which one friction transfer mechanism is coupled and the transmission output shaft through a gear train and engaging the one friction transfer mechanism and disengaging the other friction transfer mechanism; and standby control is carried out by predicting a next gear position and operating a predetermined synchromesh based on a result of the prediction to couple together the transmission input shaft with which the friction transfer mechanism having not been used for the achievement of the desired gear position is coupled and the transmission output shaft through a predetermined gear train and bring the transmission input shaft and the transmission output shaft into standby state.

Furthermore, the shift control device apparatus is configured so as to carry out timing with which operation for synchromesh coupling by the standby control is started, under condition of determining that the friction transfer mechanism having not been used for achievement of the desired gear position has been disengaged regardless of completion of the achievement of the desired gear position.

According to the invention, pre-shift operation is started when it is determined that the disengagement of the clutch on standby has been completed even during shifting.

Therefore, the timing of start of pre-shift control can be advanced, and thus the response can be enhanced when a shifting request continuously occurs.

DETAILED DESCRIPTION OF THE PREFERRED EMBODIMENTS

Hereafter, detailed description will be given to embodiments of the invention with reference to FIG. 1 to FIG. 6.

First, description will be given to an example of the configuration of a control apparatus for automobiles of the invention having an automatic transmission with reference to FIG. 1.

Figure 1:
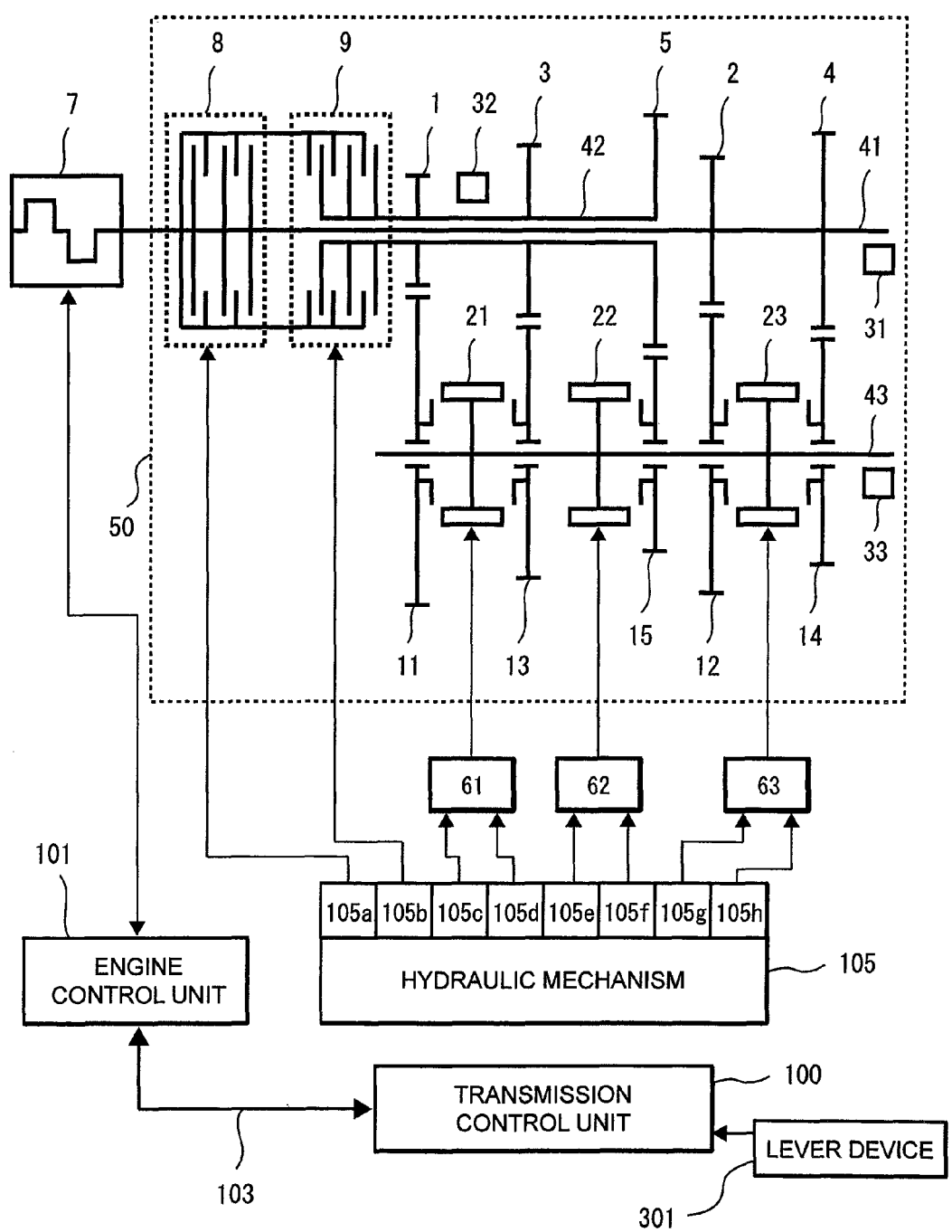
FIG. 1 is a skeleton diagram illustrating the configuration of an automatic transmission in an embodiment of the invention.

FIG. 1 is a skeleton diagram of an example of the configuration of a system, illustrating a control apparatus for automobiles of the invention having an automatic transmission in an embodiment.

An automobile is provided with an engine 7 as a driving force source, an engine speed sensor (not shown) for measuring a speed of the engine 7, an electronic throttle (not shown) for controlling engine torque, and a fuel injection system (not shown) for injecting a quantity of fuel appropriate to an intake air flow rate. The intake air flow rate, fuel quantity, ignition timing, and the like are controlled by an engine control unit 101, and the torque of the engine 7 can be thereby accurately controlled. There are different types of the fuel injection system, for example, an inlet port injection type in which fuel is injected toward an inlet port and a direct injection type in which fuel is directly injected into a cylinder. It is advantageous to use an engine of such a type that fuel consumption can be reduced and favorable exhaust performance can be obtained by comparing the operating ranges (range determined by engine torque and engine speed) required of both types-engine. The driving force source need not be a gasoline engine and any of a diesel engine, a natural gas engine, an electric motor, and the like can be used for this purpose.

An automatic transmission 50 is provided with a first clutch 8, a second clutch 9, a first input shaft 41, a second input shaft 42, an output shaft 43, a first drive gear 1, a second drive gear 2, a third drive gear 3, a fourth drive gear 4, a fifth drive gear 5, a reverse drive gear (not shown), a first driven gear 11, a second driven gear 12, a third driven gear 13, a fourth driven gear 14, a fifth driven gear 15, a reverse driven gear (not shown), a first synchromesh 21, a second synchromesh 22, a third synchromesh 23, a rotation sensor 31, a rotation sensor 32, and a rotation sensor 33. Torque of the engine 7 can be transferred to the first input shaft 41 and this transfer can be interrupted, by engaging or disengaging the first clutch 8. The torque of the engine 7 can be transferred to the second input shaft 42 and this transfer can be interrupted, by engaging or disengaging the second clutch 9. In the example, a multiple wet clutch is used for the first clutch 8 and the second clutch 9. Instead, a single dry clutch may be used, and any types of friction transfer mechanism can be used. They can also be constructed of electromagnetic powder clutches.

The second input shaft 42 is comprised of a hollow-shaft. The first input shaft 41 is inserted through the second input shaft 42 and can be moved freely relative to the second input shaft 42 in a direction of rotation.

The first drive gear 1, third drive gear 3, fifth drive gear 5 and reverse drive gear (not shown) are fixed on the second input shaft 42, and can be freely rotated relative to the first input shaft 41. The second drive gear 2 and fourth drive gear 4 are fixed on the first input shaft 41, and can be moved freely relative to the second input shaft 42 in the direction of rotation.

The sensor 31 is to sense a rotational speed of the first input shaft 41, and the sensor 32 is to sense a rotational speed of the second input shaft 42.

The output shaft 43 is provided with the first driven gear 11, second driven gear 12, third driven gear 13, fourth driven gear 14, fifth driven gear 15, and reverse driven gear (not shown). The first driven gear 11, second driven gear 12, third driven gear 13, fourth driven gear 14, fifth driven gear 15, and reverse driven gear (not shown) are provided such that they can be freely rotated relative to the output shaft 43.

The sensor 33 is to sense a rotational speed of the output shaft 43.

Of these gears, the first drive gear 1 is meshed with the first driven gear 11 and the second drive gear 2 is meshed with the second driven gear 12. Further, the third drive gear 3 is meshed with the third driven gear 13 and the fourth drive gear 4 is meshed with the fourth driven gear 14. Furthermore, the fifth drive gear 5 is meshed with the fifth driven gear 15. The reverse drive gear (not shown), an idler gear (not shown), and the reverse driven gear (not shown) are engaged with each other.

The first synchromesh 21 is provided between the first driven gear 11 and the third driven gear 13 to selectively allow the first driven gear 11 to engage with the output shaft 43 or allow the third driven gear 13 to engage with the output shaft 43.

The third synchromesh 23 is provided between the second driven gear 12 and the fourth driven gear 14 to selectively allow the second drive gear 12 to engage with the output shaft 43 and allow the fourth driven gear 14 to engage with the output shaft 43.

The second synchromesh 22 is provided to allow the fifth driven gear 15 to engage with the output shaft 43.

Currents of an electromagnetic valve 105c and an electromagnetic valve 105d provided in hydraulic equipment 105 are controlled by a transmission control unit 100. A position or load of the first synchromesh 21 is thereby controlled through a hydraulic piston (not shown) and a shift fork (not shown) provided in a shift actuator 61. The first driven gear 11 or the third driven gear 13 is thereby allowed to engage with the output shaft 43. As a result, torque of the second input shaft 42 can be transferred to the output shaft 43 through the first drive gear 1, the first driven gear 11 and the first synchromesh 21 or through the second drive gear 3, the second driven gear 13 and the first synchromesh gear 21. For example, provided that the current of the electromagnetic valve 105d is increased, a load is applied in such a direction that the first synchromesh 21 is moved toward the first driven gear 11; and provided that the current of the electromagnetic valve 105c is increased, a load is applied in such a direction that the first synchromesh 21 is moved toward the third driven gear 13. The shift actuator 61 is provided with a position sensor 61a (not shown) for measuring the position of the first synchromesh 21.

Currents of an electromagnetic valve 105e and an electromagnetic valve 105f provided in the hydraulic equipment 105 are controlled by the transmission control unit 100. A position or load of the second synchromesh 22 is thereby controlled through a hydraulic piston (not shown) and a shift fork (not shown) provided in a shift actuator 62. The fifth driven gear 15 is thereby allowed to engage with the output shaft 43. As a result, torque of the second input shaft 42 can be transferred to the output shaft 43 through the fifth drive gear 5, the fifth driven gear, and the second synchromesh 22. The shift actuator 62 is provided with a position sensor 62a (not shown) for measuring the position of the second synchromesh 22.

Currents of an electromagnetic valve 105g and an electromagnetic valve 105h provided in the hydraulic equipment 105 are controlled by the transmission control unit 100. A position or load of the third synchromesh 23 is thereby controlled through a hydraulic piston (not shown) and a shift fork (not shown) provided in a shift actuator 63. The second driven gear 12 or the fourth driven gear 14 is thereby allowed to engage with the output shaft 43. As a result, torque of the first input shaft 41 can be transferred to the output shaft 43 through the second drive gear 2, the second driven gear 12 and the third synchromesh 23 or the fourth drive gear 4, the fourth driven gear 14 and the third synchromesh 23. The shift actuator 63 is provided with a position sensor 63a (not shown) for measuring the position of the third synchromesh 23.

As mentioned above, the torque of the transmission input shaft 41 is transferred from the first drive gear 1, second drive gear 2, third drive gear 3, fourth drive gear 4, or fifth drive gear 5 to the transmission output shaft 43 through the first driven gear 11, second driven gear 12, third driven gear 13, fourth driven gear 14, and fifth driven gear 15. Then, the torque is transferred to an axle (not shown) through a differential gear (not shown) coupled with the transmission output shaft 43.

Further, a current of an electromagnetic valve 105a provided in the hydraulic equipment 105 is controlled by the transmission control unit 100. A pressure plate (not shown) provided in the first clutch 8 is thereby controlled to control the transfer torque of the first clutch 8.

Furthermore, a current of an electromagnetic valve 105b provided in the hydraulic equipment 105 is controlled by the transmission control unit 100. A pressure plate (not shown) provided in the second clutch 9 is thereby controlled to control the transfer torque of the second clutch 9.

A range position signal indicating the shift lever position, P range, R range, N range, D range, or the like, is inputted from a lever device 301 to the transmission control unit 100.

The transmission control unit 100 and the engine control unit 101 transmit and receive information to and from each other through a communication means 103.

The shift actuator 61 is controlled by the electromagnetic valve 105c and the electromagnetic valve 105d to mesh the first synchromesh 21 with the first driven gear 11. In this state, when the second clutch 9 is engaged, 1st gear running is carried out.

The shift actuator 63 is controlled by the electromagnetic valve 105g and the electromagnetic valve 105h to mesh the third synchromesh 23 with the second driven gear 12. In this state, when the first clutch 8 is engaged, 2nd gear running is carried out.

Furthermore the shift actuator 61 is controlled by the electromagnetic valve 105c and the electromagnetic valve 105d to mesh the first synchromesh 21 with the third driven gear 13. In this state, when the second clutch 9 is engaged, 3rd gear running is carried out.

The shift actuator 63 is also controlled by the electromagnetic valve 105g and the electromagnetic valve 105h to mesh the third synchromesh 23 with the fourth driven gear 14. In this state, when the first clutch 8 is engaged, 4th gear running is carried out.

The shift actuator 62 is controlled by the electromagnetic valve 105e and the electromagnetic valve 105f to mesh the second synchromesh 22 with the fifth driven gear 15. In this state, when the second clutch 9 is engaged, 5th gear running is carried out.

The shift actuator 62 is controlled by the electromagnetic valve 105e and the electromagnetic valve 105f to mesh the second synchromesh 22 with the reverse driven gear (not shown). In this state, when the second clutch 9 is engaged, reverse gear running is carried out.

In this example, up shift from the 1st gear to the 2nd gear is carried out as follows. In the 1st gear running before the up shift, the first synchromesh 21 is meshed with the first driven gear 11 by controlling the shift actuator 61 by the electromagnetic valve 105c and the electromagnetic valve 105d and engaging the second clutch 9 by the electromagnetic valve 105b. In this state, the shift actuator 63 is controlled by the electromagnetic valve 105g and the electromagnetic valve 105h to mesh the third synchromesh 23 with the second driven gear 12. Furthermore, the first clutch 8 is gradually engaged and the second clutch 9 is gradually disengaged.

In this example, the hydraulic equipment with the electromagnetic valve and hydraulic piston is used as a mechanism for operating the first synchromesh 21, second synchromesh 22, and third synchromesh 23. An electric motor and a reduction gear may be used as the mechanism in place of the electromagnetic valve and the hydraulic piston or an electric motor and a drum may be used as the mechanism. Further, any other mechanism may be used for controlling the synchromesh 21, 22, and 23. Provided that an electric motor is used as the mechanism, various motor scan be applied. For example, the motor may be a so-called direct-current motor in which a magnet is used as stator and a motor winding is used as rotor or may be a so-called permanent-magnet synchronous motor in which a motor winding is used as stator and a magnet is used as rotor.

In this example, the hydraulic equipment with the electromagnetic valve is used as a mechanism for operating the first clutch 8 and the second clutch 9. Instead of it, the clutches may be operated by using an electric motor and a reduction gear or using pressure plates of the clutches. The pressure plates may be controlled by an electromagnetic coil. Any other mechanism may be used for controlling the first clutch 8 and the second clutch 9.

Figure 2:
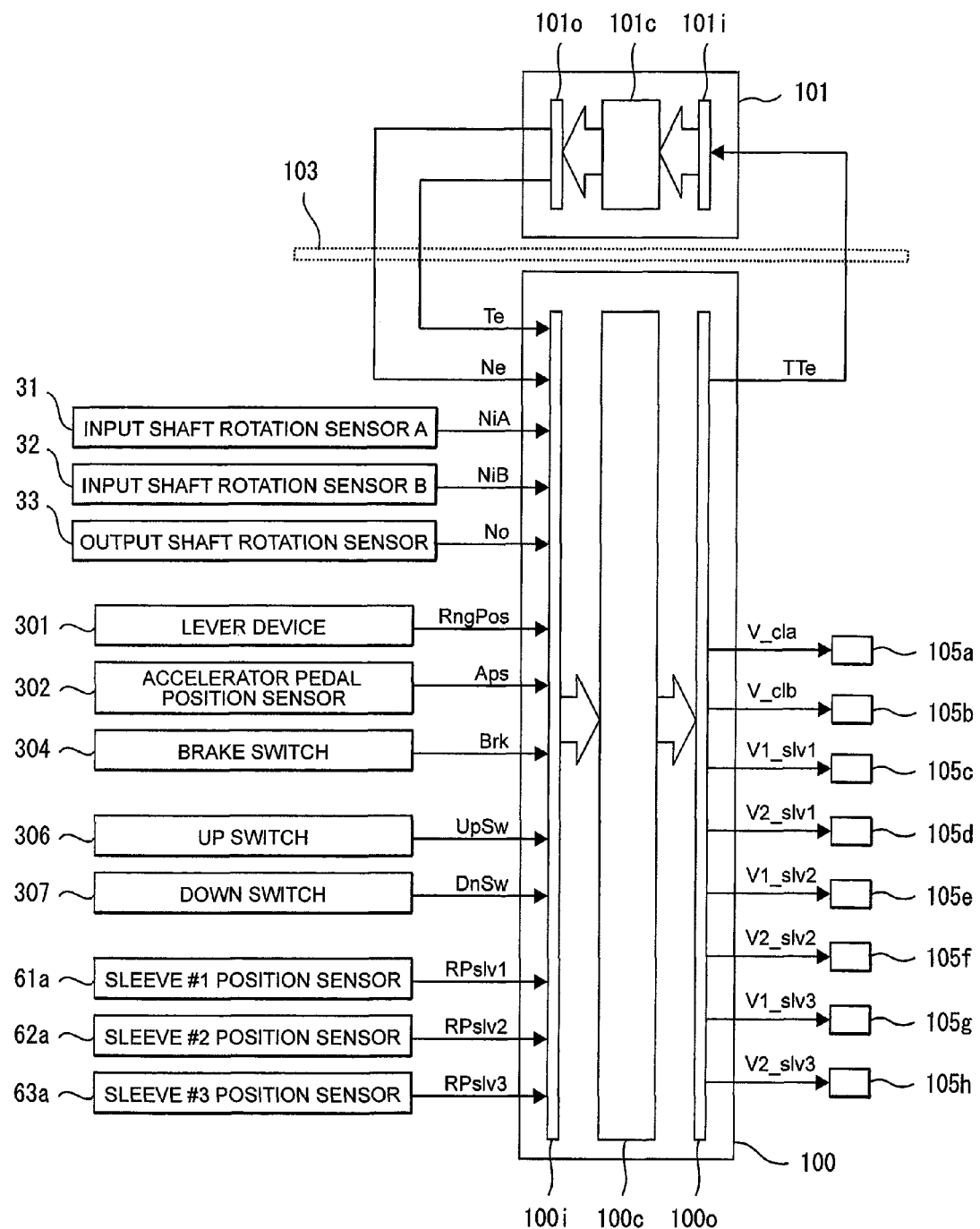
FIG. 2 is a block diagram illustrating a relation of input/output signals of a transmission control unit 100 and an engine control unit 101 used in a control apparatus for automatic transmissions in an embodiment of the invention.

FIG. 2 illustrates relations of input/output signals between the transmission control unit 100 and the engine control unit 101. The transmission control unit 100 is configured by a control unit having an input unit 100i, an output unit 100o, and a computer 100c. Similarly, the engine control unit 101 is also configured by a control unit having an input unit 101i, an output unit 101o, and a computer 101c. An engine torque command value TTe is transmitted from the transmission control unit 100 to the engine control unit 101 using the communication means 103. The engine control unit 101 controls intake air flow rate, fuel quantity, ignition timing, and the like (not shown) of the engine 7 so that TTe is attained. The engine control unit 101 is provided therein with a determination means (not shown) for determining engine torque that becomes input torque to the transmission. The speed Ne of the engine 7 and the engine torque Te produced by the engine 7 are determines by the engine control unit 101 and are transmitted to the transmission control unit 100 by using the communication means 103. As the engine torque determination means, a torque sensor may be used or an estimating means using a parameter of the engine, such as the injection pulse width of injectors, the pressure in an intake pipe, engine speed, or the like, may be used.

The transmission control unit 100 performs the following operation to obtain a desired first clutch transfer torque: it controls the voltage V_cla applied to the electromagnetic valve 105a and thereby controls the current of the electromagnetic valve 105a to engage or disengage the first clutch 8.

Furthermore the transmission control unit 100 performs the following operation to obtain a desired second clutch transfer torque: it controls the voltage V_clb applied to the electromagnetic valve 105b and thereby controls the current of the electromagnetic valve 105b to engage or disengage the second clutch 9.

Furthermore the transmission control unit 100 performs the following operation to achieve a desired position of the first synchromesh 21: it controls the voltages V1_slv1, V2_slv1 applied to the electromagnetic valves 105c, 105d and thereby controls the current of the electromagnetic valves 105c, 105d to mesh or disengage the first synchromesh 21.

Furthermore the transmission control unit 100 performs the following operation to achieve a desired position of the second synchromesh 22: it controls the voltages V1_slv2, V2_slv2 applied to the electromagnetic valves 105e, 105f and thereby controls the current of the electromagnetic valves 105e, 105f to mesh or disengage the second synchromesh 22.

The transmission control unit 100 adjusts the voltages V1_slv3, V2_slv3 applied to the electromagnetic valves 105g, 105h to achieve a desired position of the third synchromesh 23. It thereby controls the current of the electromagnetic valves 105g, 105h to mesh or disengage the third synchromesh 23.

The transmission control unit 100 is provided with a current sensing circuit (not shown). It controls the current of each electromagnetic valve by varying voltage output such that the current of each electromagnetic valve becomes equal to a target current.

The transmission control unit 100 takes in first input shaft speed signal NiA, second input shaft speed signal NiB, and output shaft speed signal No from the rotation sensor 31, rotation sensor 32, and rotation sensor 33, respectively. Further, it takes in the following signals: a range position signal RngPos indicating the shift lever position, P range, R range, N range, D range, or the like, from the lever device 301; an accelerator pedal position signal Aps from an accelerator pedal position sensor 302; and an on/off signal Brk from a brake switch 304 for detecting whether or not a brake pedal has been depressed.

In this example, a so-called manual mode function is also provided in addition to automatic mode function and a driver manually instructs up shift/down shift. Consequently, the transmission control unit 100 takes in on/off signals UpSw, DnSw from an up-switch 306 and a down-switch 307, respectively.

Further, the transmission control unit 100 takes in the following signals from a sleeve #1 position sensor 61a, a sleeve #2 position sensor 62a, and a sleeve #3 position sensor 63a: a sleeve #1 position signal RPslv1, a sleeve #2 position signal RPslv2, and a sleeve #3 position signal RPslv3 respectively indicating the stroke positions of the first synchromesh 21, second synchromesh 22, and third synchromesh 23.

For example, when a driver sets the shift range to D range or the like and depresses the accelerator pedal, the transmission control unit 100 determines that the driver is willing to start up or accelerate his/her automobile. When the driver depresses the brake pedal, it determines that the driver is willing to decelerate or stop his/her automobile. Then, it sets an engine torque command value TTe, a first clutch target transfer torque TTs1, and a second clutch target transfer torque TTs2 so as to carry out the driver's intention.

Further, it sets a gear position as a target from a vehicle speed Vsp computed from an output shaft speed No and an accelerator pedal position Aps. Then, it sets the following so as to perform the operation of shifting to the set gear position: an engine torque command value TTe; a first clutch target transfer torque TTs1; a second clutch target transfer torque TTs2; a target sleeve #1 (a sleeve #1 corresponds to the first syncromesh 21) position TPslv1; a target sleeve #2 (a sleeve #2 corresponds to the second syncromesh 22) position TPslv2; and a target sleeve #3 (a sleeve #3 corresponds to the third syncromesh 23) position TPslv3.

The transmission control unit 100 outputs the following so as to achieve the set first clutch target transfer torque TTs1, second clutch target transfer torque TTs2, target sleeve #1 position TPslv1, target sleeve #2 position TPslv2, and target sleeve #3 position TPslv3: voltages V_cla, V_clb, V1_slv1, V2_slv1, V1_slv2, V2_slv2, V1_slv3, V2_slv3 applied to the electromagnetic valves 105a, 105b, 105c, 105d, 105e, 105f, 105g, 105h.

Description will be given to the concrete details of pre-shift control by a control apparatus for automatic transmissions in this embodiment with reference to FIG. 3 to FIG. 7.

Figure 3:
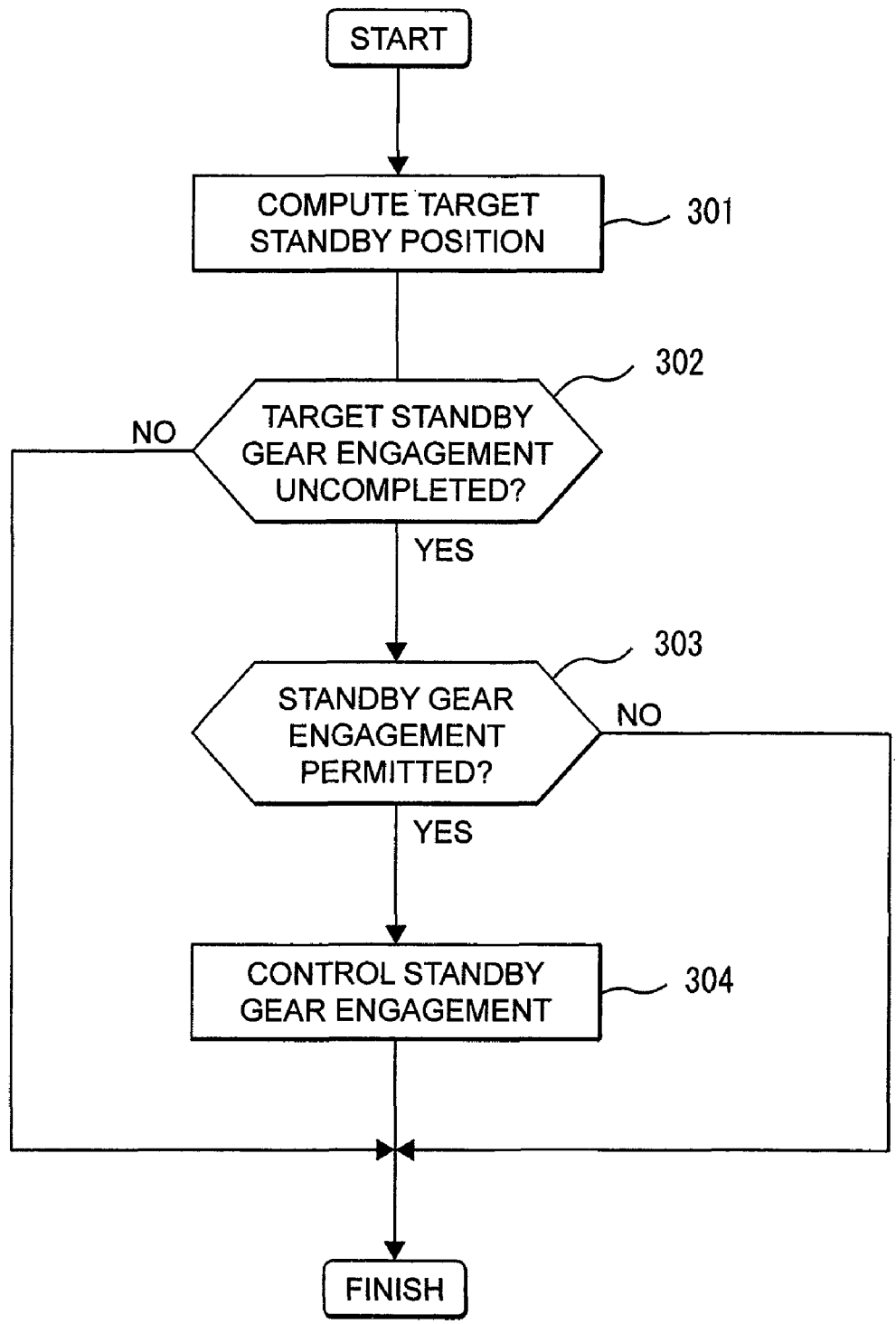
FIG. 3 is a flowchart illustrating an outline of the details of control by the control apparatus for automatic transmissions in an embodiment of the invention.

FIG. 3 is a flowchart illustrating the outline of the details of entire pre-shift control by a control apparatus for automatic transmissions in an embodiment of the invention.

The flow of the pre-shift control is comprised of Step 301 (target standby position computation), Step 302 (target standby gear engagement in completion determination), Step 303 (standby-side clutch disengagement completion determination), and Step 304 (standby gear engagement control).

Contents of the processing in FIG. 3 are programmed in the computer 100c of the transmission control unit 100, and this processing is repeatedly carried out at predetermined intervals. That is, the following processing of Steps 301 to 304 is carried out by the transmission control unit 100.

At Step 301 (target standby position computation), a target standby gear position tGP_stb as a target value of the gear position in which a gear should be kept on standby in preparation for the next shifting operation is set. It is set based on a range position signal RngPos, an up switch Up signal Sw, a down switch signal DnSw, an accelerator pedal position signal Aps, a vehicle speed signal Vsp, a brake on/off signal Brk, and the like.

At Step 302 (target standby gear engagement incompletion determination), the following processing is carried out: when a sleeve position as a synchromesh position pertaining to the target standby gear position tGP_stb set at Step 301 is in a mesh position, it is determined that standby gear engagement has been completed and the pre-shift control is terminated; and when the sleeve position is not in a mesh position, the flow proceeds to Step 303.

At Step 303 (standby gear engagement permission determination), it is determined whether or not the engagement of a standby gear has been permitted. When the engagement of the standby gear has been permitted, the flow proceeds to Step 304. When the engagement of the standby gear is not permitted, the pre-shift control in the relevant cycle of execution is terminated.

At Step 304 (standby gear engagement control), an engagement load is set by a function using a sleeve position as input. With respect to this function, it is desirable to take the following measure: when a distance from the neutral position to a sleeve position is small (in proximity to the neutral; hereinafter the distance is called in abbreviated form as sleeve position), it takes a relatively small value; when the sleeve position is in an intermediate range (in proximity to the synchronization position), it takes a relatively large value; and when the sleeve position is large (in proximity to the mesh position), it takes a relatively small value again. In consideration of the durability of the synchromeshes, it is desirable that the function should be set so that it takes as small a value as possible with which a standby gear can be engaged.

Detailed description will be given to Step 303 (standby gear engagement permission determination) in FIG. 3 with reference to FIG. 4.

At Step 401, it is determined whether or not the current mode is automatic shift mode. When the current mode is automatic shift mode, the flow proceeds to Step 402. When the current mode is not automatic shift mode, for example, when the current mode is manual shift mode, the flow proceeds to Step 405.

At Step 402, it is determined whether or not shifting has been completed. That is, it is determined whether or not the clutch to clutch shift in engagement was completed and a desired gear position has been achieved. When shifting has been completed, the flow proceeds to Step 403. When shifting has not been completed, the flow proceeds to Step 404.

At Step 403, the engagement of the stand by gear is permitted. At Step 404, the engagement of the standby gear is not permitted.

At Step 405, it is determined whether or not the disengagement of the clutch on standby coupled with the transmission input shaft having the target standby gear position tGP_stb set at Step 301 has been completed. When it is determined that the disengagement of the clutch on standby has been completed, the flow proceeds to Step 406. When the disengagement of the clutch on standby has not been completed, the flow proceeds to Step 407.

At Step 406, the engagement of the stand by gear is permitted. At Step 407, the engagement of the standby gear is not permitted.

Figure 4:
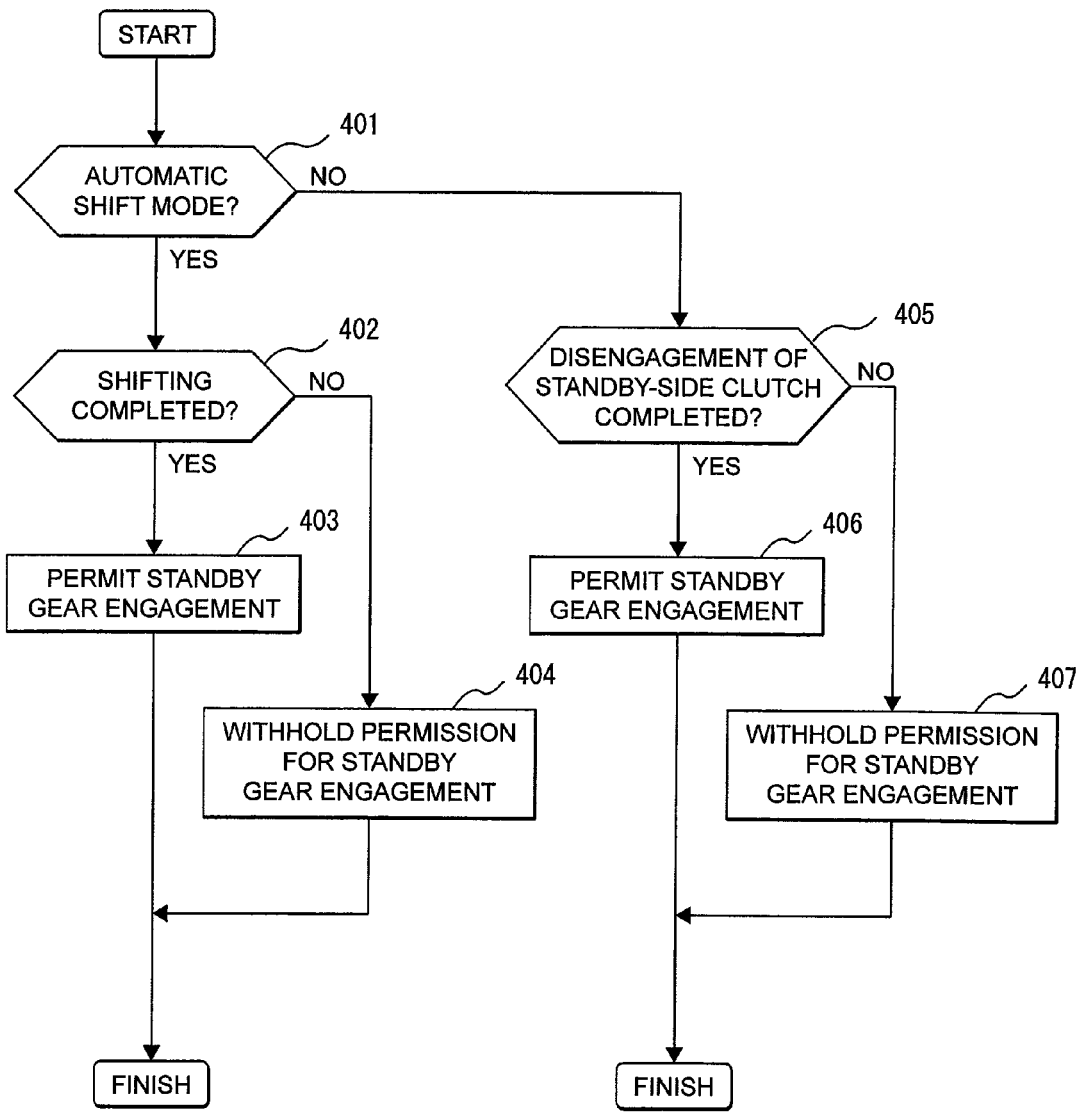
FIG. 4 is a flowchart illustrating the details of the engagement permission determination processing for a standby gear illustrated in FIG. 3.

The example in FIG. 4 is constructed such that the timing of permission for the engagement of a standby gear is varied according to whether the current mode is automatic shift mode or any other mode. Instead, the timing of permission for the engagement of a standby gear may be varied according to any other condition, for example, oil temperature.

Description will be given to an example of first pre-shift control carried out when it is constructed as illustrated in FIG. 3 and FIG. 4 with reference to FIG. 5.

Figure 5:
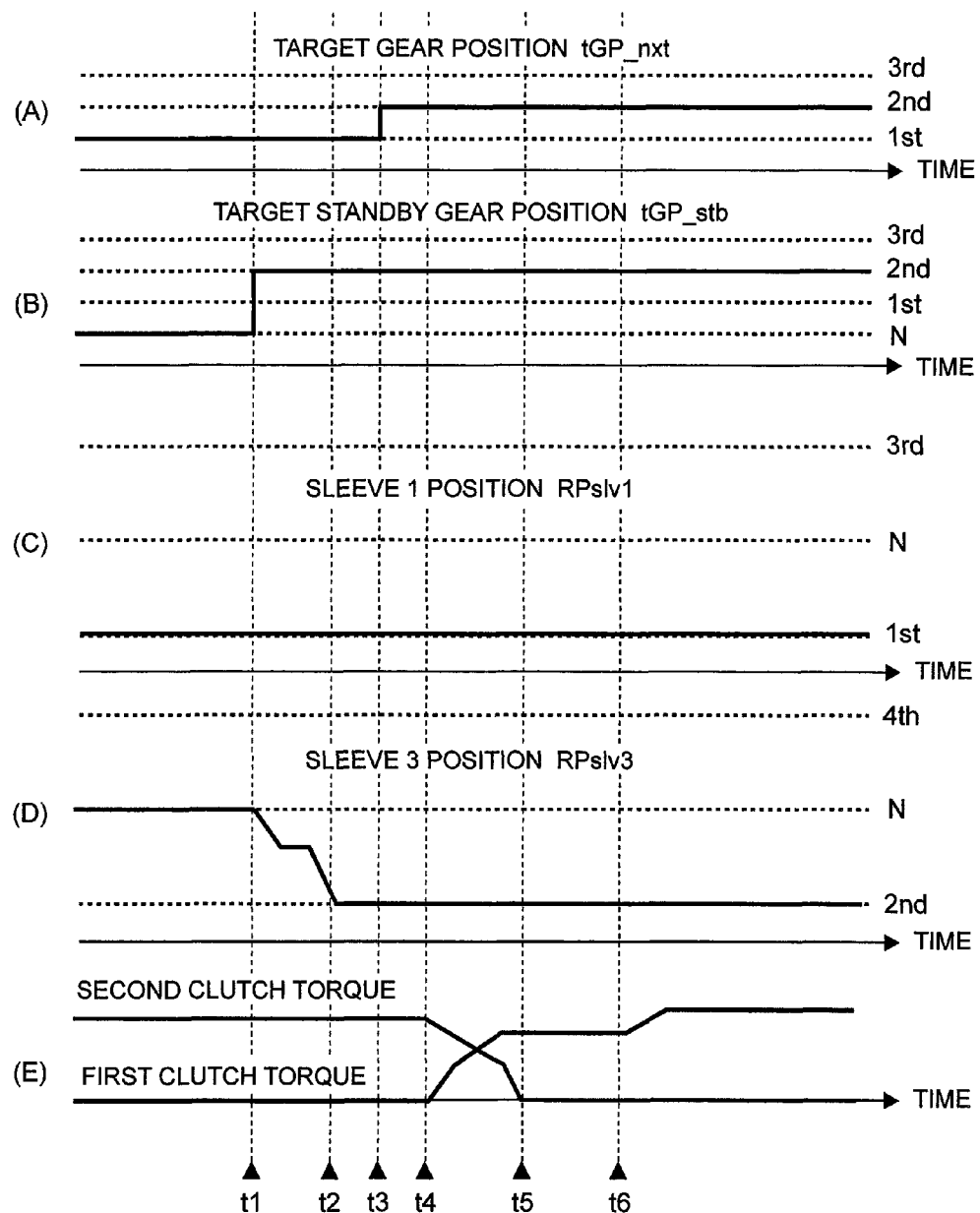
FIG. 5 is a time diagram illustrating an example of first pre-shift control by the control apparatus for automatic transmissions in an embodiment of the invention.

FIG. 5 is a time diagram illustrating an example of the first pre-shift control in an automobile equipped with a control apparatus for automatic transmissions in an embodiment of the invention. This example of the first pre-shift control illustrates the following: the details of pre-shift control carried out when the vehicle is running in the 1st gear and the target standby gear position, which is a target value of the gear position in which a gear should be kept on standby in preparation for the next shifting operation, is changed from N to 2nd gear; and the details of control carried out when the gear position is shifted from 1st gear to 2nd gear based on a shifting request that subsequently occurs.

In FIG. 5, FIG. 5(A) indicates a target gear position tGP_nxt; FIG. 5(B) indicates a target standby gear position tGP_stb; and FIG. 5(C) indicates a sleeve 1 position RPslv1. 3rd indicates the engagement position on the 3rd gear side; N is the neutral position; and 1st indicates the mesh position on the 1st gear side. FIG. 5(D) indicates a sleeve #3 position RPslv3. 4th indicates the engagement position on the 4th gear side; N indicates the neutral position; and 2nd indicates the mesh position on the 2nd gear side. FIG. 5(E) indicates first clutch torque and second clutch torque.

Before time t1, the various positions are set as follows and the vehicle is running in the 1st gear: the target gear position tGP_nxt is 1st for "1st gear" as indicted in FIG. 5(A); the target standby gear position tGP_stb is N for "neutral" as indicated in FIG. 5(B); the sleeve #1 position RPslv1 is 1st for the engagement position on the 1st gear side as indicated in FIG. 5(C); and the sleeve #3 position RPslv3 is N for the neutral position as indicated in FIG. 5(D).

At time t1, the target standby gear position tGP_stb in FIG. 5(B) is shifted from N for "neutral" to 2nd for "2nd gear" by the processing of Step 301 (target gear position computation) in FIG. 3. Then, the determination of Step 402 or Step 405 is carried out according to whether or not the result processing of Step 401 in FIG. 4 is automatic shift mode. In the processing of either step, the positive determination is made at time t1. Therefore, it is determined at Step 303 (standby gear engagement permission determination) that the engagement of the standby gear has been permitted. Then, shifting of the sleeve 3 position RPslv3 in FIG. 5(D) from N for the neutral position to 2nd for the engagement position on the 2nd gear side is started by the processing of Step 304 (standby gear engagement control).

When the shifting of the sleeve #3 position RPslv3 to 2nd is completed at time t2, the pre-shift control in FIG. 3 is terminated.

When the target gear position tGP_nxt in FIG. 5(A) is shifted from 1st for "1st gear" to 2nd for "2nd gear" at time t3, shifting is started. When the preparation for clutch operation is completed at time t4, the second clutch torque is reduced to start disengagement and further the first clutch torque is gradually increased to start engagement. When the clutch to clutch shift in engagement is completed at time t5, so-called inertia phase control is carried out to control speed of rotation. At time t6, the shifting is completed.

Description will be given to an example of second pre-shift control carried out when it is constructed as illustrated in FIG. 3 and FIG. 4 with reference to FIG. 6.

Figure 6:
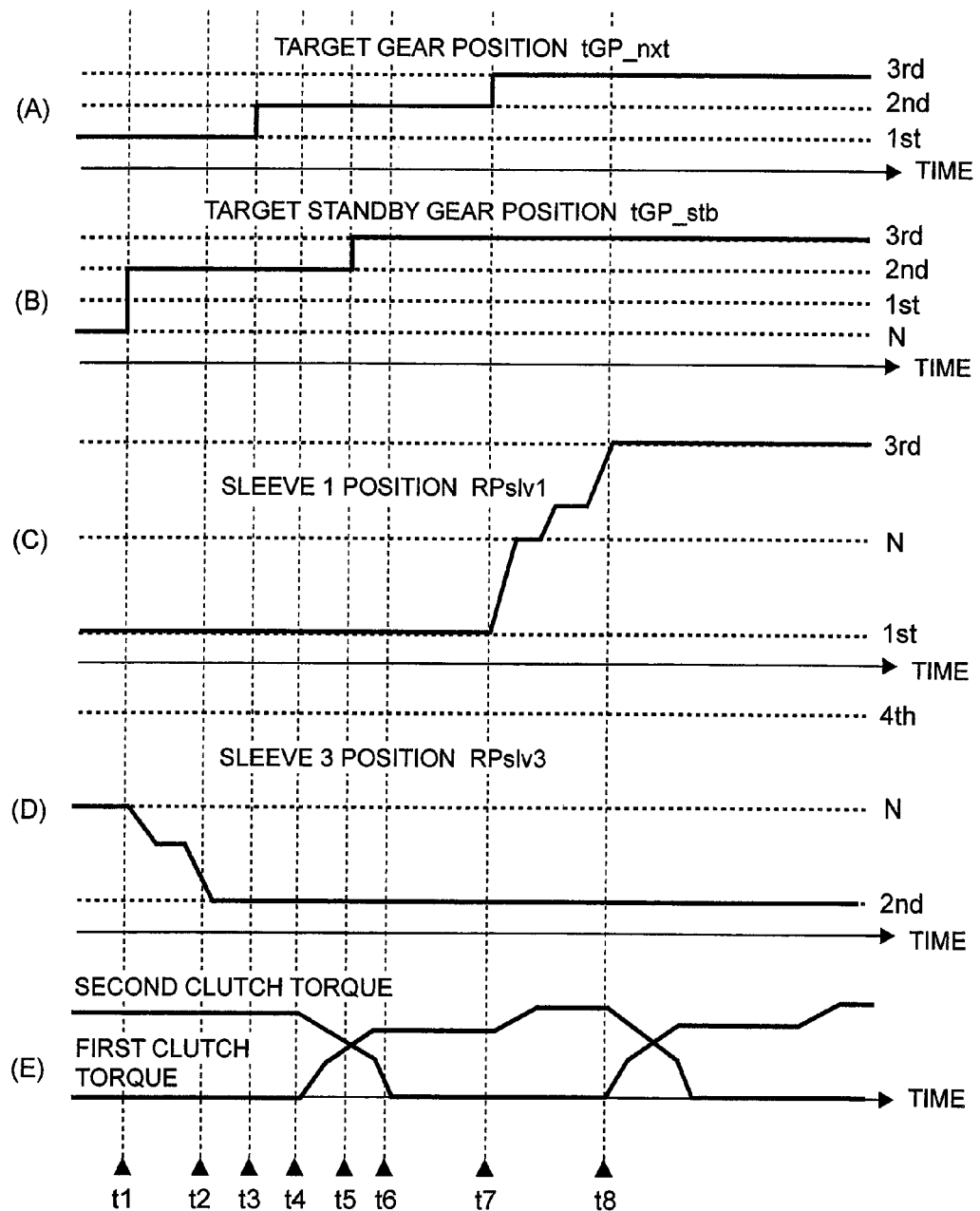
FIG. 6 is a time diagram illustrating an example of second pre-shift control by the control apparatus for automatic transmissions in an embodiment of the invention.

FIG. 6 is a time diagram illustrating an example of the second pre-shift control in an automobile equipped with a control apparatus for automatic transmissions in an embodiment of the invention. This example of the second pre-shift control illustrates the following: the details of pre-shift control carried out when the vehicle is running in the 1st gear in automatic shift mode and the target standby gear position, which is a target value of the gear position in which a gear should be kept on standby in preparation for the next shifting operation, is changed from N to 2nd gear; and the details of pre-shift control carried out when, immediately after the shifting from 1st gear to 2nd gear is started based on a shifting request that subsequently occurs, a request to shift the target standby gear position from 2nd gear to 3rd gear occurs.

In FIG. 6, the time on the horizontal axis is the same as that in FIG. 5.

FIG. 6(A), FIG. 6(B), FIG. 6(C), FIG. 6(D), and FIG. 6(E) respectively indicate the same signals as in FIG. 5(A), FIG. 5(B), FIG. 5(C), FIG. 5(D), and FIG. 5(E).

The contents before time t4 are the same as those illustrated in FIG. 5.

At time t5, the target standby gear position tGP_stb in FIG. 6(B) is shifted from 2nd for "2nd gear" to 3rd for "3rd gear." Since it is determined at Step 401 in FIG. 4 that the current mode is automatic shift mode, the determination of Step 402 is carried out. At time t5, the determination of Step 402 becomes negative, namely the determination is that the shifting is being done at present. Therefore, it is determined at Step 303 (standby gear engagement permission determination) that the engagement of the standby gear has not been permitted. When the shifting is completed at time t7, the positive determination is made at Step 402. Therefore, it is determined at Step 303 (standby gear engagement permission determination) that the engagement of the standby gear has been permitted. Then, shifting of the sleeve #1 position RPslv1 in FIG. 5(C) from 1st for the engagement position on the 1st gear side to 3rd for the engagement position on the 3rd gear side is started by the processing of Step 304 (standby gear engagement control).

When the shifting of sleeve #1 position RPslv1 to 3rd is completed at time t8, the pre-shift control in FIG. 3 is terminated. At time t7, the target gear position tGP_nxt in FIG. 6(A) is shifted from 2nd for "2nd gear" to 3rd for "3rd gear." However, the shifting of the sleeve #1 position RPslv1 to 3rd has not been completed at time t7-t8, and shifting is not started. When the shifting of the sleeve 1 position RPslv1 to 3rd is thereafter completed at time t8, shifting is started.

Description will be given to an example of third pre-shift control carried out when it is constructed as illustrated in FIG. 3 and FIG. 4 with reference to FIG. 7.

Figure 7:
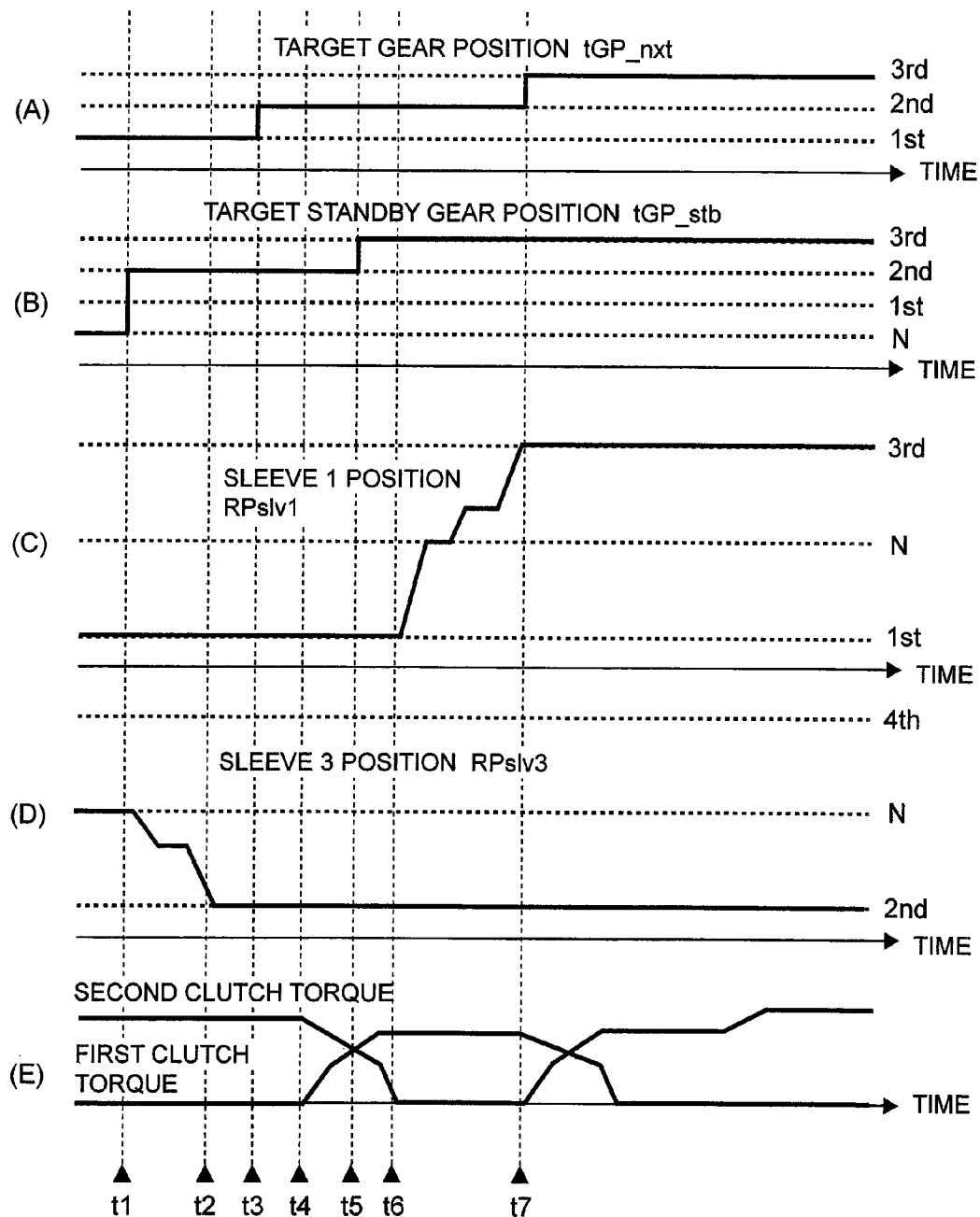
FIG. 7 is a time diagram illustrating an example of third pre-shift control by the control apparatus for automatic transmissions in an embodiment of the invention.

FIG. 7 is a time diagram illustrating an example of the third pre-shift control in an automobile equipped with a control apparatus for automatic transmissions in an embodiment of the invention. This example of the third pre-shift control illustrates the following: the details of pre-shift control carried out when the vehicle is running in the first gear in manual shift mode and the target standby gear position, which is a target value of the gear position in which a gear should be kept on standby in preparation for the next shifting operation, is changed from N to 2nd gear; and the details of pre-shift control carried out when immediately after the shifting from 1st gear to 2nd gear is started based on a shifting request that subsequently occurs, a request to shift the target standby gear position from 2nd gear to 3rd gear occurs.

In FIG. 7, the time on the horizontal axis is the same as that in FIG. 5.

FIG. 7(A), FIG. 7(B), FIG. 7(C), FIG. 7(D), and FIG. 7(E) respectively indicate the same signals as in FIG. 5(A), FIG. 5(B), FIG. 5(C), FIG. 5(D), and FIG. 5(E).

The contents before time t6 are the same as those illustrated in FIG. 5. FIG. 7 is different from FIG. 6 in that the following operation is performed. At time t6, it is determined at Step 401 in FIG. 4 that the current mode is manual shift mode. Therefore, the determination of Step 405 is carried out. Because of the disengagement of second clutch torque, the positive determination is made at step 405. Consequently, it is determined at Step 303 (standby gear engagement permission determination) that the engagement of the standby gear has been permitted. Then, shifting of the sleeve 1 position RPSlv1 in FIG. 7(C) from 1st for the engagement position on the 1st gear side to 3rd for the engagement position on the 3rd gear side is started by the processing of Step 304 (standby gear engagement control).

When the shifting of the sleeve 1 position RPslv1 to 3rd is completed at time t7, the pre-shift control in FIG. 3 is terminated. At time t7, the target gear position tGP_nxt in FIG. 6(A) shifted from 2nd for "2nd gear" to 3rd for "3rd gear." Since the shifting of the sleeve 1 position RPslv1 to 3rd has been completed, shifting is immediately started.

When a control apparatus for automatic transmissions is constructed as mentioned above, it is possible to advance the timing of start of pre-shift control and enhance the response when a shifting request continuously occurs.

What is claimed is:

1. A shift control apparatus for automatic transmissions, comprising: plural friction transfer mechanisms for transferring power of a driving force source and interrupting this transfer; plural transmission input shafts respectively coupled with the friction transfer mechanisms; and plural gear trains for selectively coupling together the transmission input shafts and a transmission output shaft by the selecting operation of plural synchromeshes, the shift control apparatus being configured such that:

a desired gear position is achieved by coupling together the transmission input shaft with which one friction transfer mechanism is coupled and the transmission output shaft through a gear train and engaging the one friction transfer mechanism and disengaging the other friction transfer mechanism; and standby control is carried out by predicting a next gear position and operating a predetermined synchromesh based on a result of the prediction to couple together the transmission input shaft with which the friction transfer mechanism having not been used for the achievement of the desired gear position is coupled and the transmission output shaft through a predetermined gear train and bring the transmission input shaft and the transmission output shaft into standby state, wherein the shift control device apparatus is configured so as to carry out timing with which operation for synchromesh coupling by the standby control is started, under condition of determining that the friction transfer mechanism having not been used for achievement of the desired gear position has been disengaged regardless of completion of the achievement of the desired gear position.

2. The shift control apparatus for automatic transmissions according to claim 1, wherein the prediction of the next gear position is carried out based on a selection of a target gear position by a driver's manual operation.

3. The shift control apparatus for automatic transmissions according to claim 1, wherein the timing with which the operation for synchromesh coupling by the standby control is started is carried out under said condition or under another condition that at least operation of the desired gear position has been completed, and wherein these conditions are selectable by the control apparatus.

4. The shift control apparatus for automatic transmissions according to claim 3, wherein the timing with which the operation for synchromesh coupling by the standby control is started is carried out according to whether a current mode is automatic shift mode in which a gear position as a target is automatically selected by the shift control apparatus or a manual shift mode in which a driver can select a gear position as a target.

5. The shift control apparatus for automatic transmissions according to claim 3, wherein the timing with which the operation for synchromesh coupling by the standby control is started is carried out according to oil temperature.

6. A shift control method using an automatic transmission comprising plural friction transfer mechanisms for transferring power of a driving force source and interrupting this transfer, plural transmission input shafts respectively coupled with the friction transfer mechanisms, and plural gear trains for selectively coupling together the transmission input shafts and a transmission output shaft by the selecting operation of plural synchromeshes, the automatic transmission being configured such that:

a desired gear position is achieved by coupling together the transmission input shaft with which one friction transfer mechanism is coupled and the transmission output shaft through a gear train and engaging the one friction transfer mechanism and disengaging the other friction transfer mechanism, the method comprising:

carrying out standby control for a next gear position by predicting the next gear position and operating a predetermined synchromesh based on a result of the prediction to couple together the transmission input shaft with which the friction transfer mechanism having not been used for the achievement of the desired gear position is coupled and the transmission output shaft through a predetermined gear train and bring the transmission input shaft and the transmission output shaft into standby state, carrying out the synchromesh coupling operation by the standby control, under condition of determining that the friction transfer mechanism having not been used for achievement of the desired gear position has been disengaged regardless of completion of the achievement of the desired gear position.

* * * * *